(12) United States Patent
Chen

(10) Patent No.: US 8,434,983 B2
(45) Date of Patent: May 7, 2013

(54) LOCKING ASSEMBLY

(75) Inventor: Hsuan-Chen Chen, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/044,688

(22) Filed: Mar. 10, 2011

(65) Prior Publication Data

US 2011/0158772 A1 Jun. 30, 2011

Related U.S. Application Data

(62) Division of application No. 11/954,232, filed on Dec. 12, 2007, now abandoned.

(30) Foreign Application Priority Data

Aug. 28, 2007 (CN) .......................... 2007 1 0201484

(51) Int. Cl.
*F16B 21/18* (2006.01)
(52) U.S. Cl.
USPC ............ 411/353; 411/347; 411/383; 411/432
(58) Field of Classification Search .................. 411/108, 411/343, 347, 353, 366.1, 367, 383, 411, 411/424, 432, 500, 107, 352, 535, 536, 546, 411/999
See application file for complete search history.

(56) References Cited

U.S. PATENT DOCUMENTS

| | | | | |
|---|---|---|---|---|
| 1,952,483 | A | * | 3/1934 | Wilson ........................... 411/204 |
| 2,779,375 | A | * | 1/1957 | O'Connor ...................... 411/134 |
| 3,018,127 | A | * | 1/1962 | Dobrosielski et al. ......... 292/251 |
| 3,343,581 | A | * | 9/1967 | Martin et al. .................. 411/349 |
| 4,915,557 | A | * | 4/1990 | Stafford ......................... 411/107 |
| 4,952,107 | A | * | 8/1990 | Dupree .......................... 411/103 |
| 5,064,324 | A | * | 11/1991 | Ragaller ....................... 411/337 |
| 5,338,139 | A | * | 8/1994 | Swanstrom ................... 411/353 |
| 5,642,972 | A | * | 7/1997 | Ellis et al. ..................... 411/353 |
| 6,238,155 | B1 | * | 5/2001 | Aukzemas et al. ............ 411/107 |
| 6,309,158 | B1 | * | 10/2001 | Bellinghausen et al. ...... 411/353 |
| 7,938,607 | B2 | * | 5/2011 | Wang ............................. 411/107 |
| 2002/0197130 | A1 | * | 12/2002 | Ozawa et al. ................. 411/353 |
| 2004/0240962 | A1 | * | 12/2004 | Teng et al. .................... 411/353 |
| 2009/0142158 | A1 | * | 6/2009 | Dai ................................ 411/353 |

\* cited by examiner

*Primary Examiner* — Robert A Delisle
(74) *Attorney, Agent, or Firm* — Altis Law Group, Inc.

(57) ABSTRACT

An exemplary locking assembly includes a locking member and a sleeve. The locking member includes a locking portion, a neck portion, and a head portion. One end of the neck portion is connected to the head portion, and another end of the neck portion is connected to the locking portion. An outer diameter of the locking portion is larger than that of the neck portion. An outer diameter of the locking portion is larger than that of the neck portion. The sleeve defines a through hole therein for holding and guiding the locking member. The through hole includes a first part. The sleeve further includes a restricting portion extending out from an inner surface of the through hole adjoining the first part of the through hole. After locking portion of the locking member passes through the restricting portion of the sleeve, the restricting portion blocks the locking portion from sliding out of the sleeve.

8 Claims, 4 Drawing Sheets

LOCKING ASSEMBLY

CROSS-REFERENCE TO RELATED APPLICATION

The present application is a divisional application of U.S. patent application Ser. No. 11/954,232, filed on Dec. 12, 2007.

BACKGROUND OF THE INVENTION

1. Field of the Invention

The present invention generally relates to locking devices, and particularly to a locking assembly having a locking member that would not slide out of the locking assembly.

2. Discussion of the Related Art

Typically, in assembling, a plurality of locking elements, such as screws, are widely used to fix at least two members tightly.

FIG. 4 shows a conventional locking structure 10. The locking structure 10 includes a first object 12, a second object 14, and a fastener 16. The second object 14 defines a stepped hole 142 therein, and the stepped hole 142 includes a first stepped part 1422 and a second stepped part 1424. A diameter of the first stepped part 1422 is smaller than that of the second stepped part 1424 of the stepped hole 142. The first object 12 defines a threaded hole 122 therein corresponding to the second stepped part 1424 of the stepped hole 142. The fastener 16 includes a head portion 162, a neck portion 164, and a threaded portion 166. One end of the neck portion 164 connects to the head portion 162 and another end of the neck portion 164 connects to the threaded portion 166. A diameter of the neck portion 164 is smaller than that of the first stepped part 1422. The threaded portion 166 of the fastener 16 is match with the threaded hole 122 of the first object 12. In assembled, the threaded portion 166 of the fastener 16 is screwed into the threaded hole 122 of the first object 12 passing through the stepped hole 142 of the second object 14, thereby fixing the first object 12 and the second object 14 tightly.

However, in disassembling, the fastener 16 is usually detached from the first object 12 and the second object 14, and is easily misplaced or lost due to its small size. Thus, it may be difficult or troublesome to re-assemble the first object 12 and the second object 14 if the fastener 16 is lost or misplaced. If the fastener 16 is a non-standard product, replacing the fastener 16 and hence the re-assembling of the locking structure 10 is more difficult. In addition, if the locking structure 10 is located in an inner portion of an electronic product (not shown) adjacent to gaps or holes of the electronic product, the fastener 16 when detached, from the first object 12 and the second object 14, may fall into the gaps or holes of the electronic product. This may result in damage or destruction of other elements of the electronic product.

What is needed, therefore, is a new locking assembly that can overcome the above-described shortcomings.

SUMMARY

A locking assembly according to a preferred embodiment includes a locking member and a sleeve. The locking member includes a locking portion, a neck portion, and a head portion. One end of the neck portion is connected to the head portion, and another end of the neck portion is connected to the threaded portion. An outer diameter of the locking portion is larger than that of the neck portion. The sleeve defines a through hole therein for holding and guiding the locking member. The through hole includes a first part, a second part, and a third part communicating with the first part in that order. The sleeve further includes a restricting portion extending out from an inner surface of the through hole adjoining the first part of the through hole and between the second part and the third part. After the locking portion of the locking member passes through the restricting portion of the sleeve, the restricting portion blocks the locking portion from sliding out of the sleeve.

Other advantages and novel features will become more apparent from the following detailed description of the preferred embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present locking assembly. Moreover, in the drawings, like reference numerals designate corresponding parts throughout the several views, and all the views are schematic.

DETAILED DESCRIPTION OF THE PREFERRED EMBODIMENTS

Reference will now be made to the drawings to describe, in detail, preferred embodiments of the present locking assembly.

Figure 1:
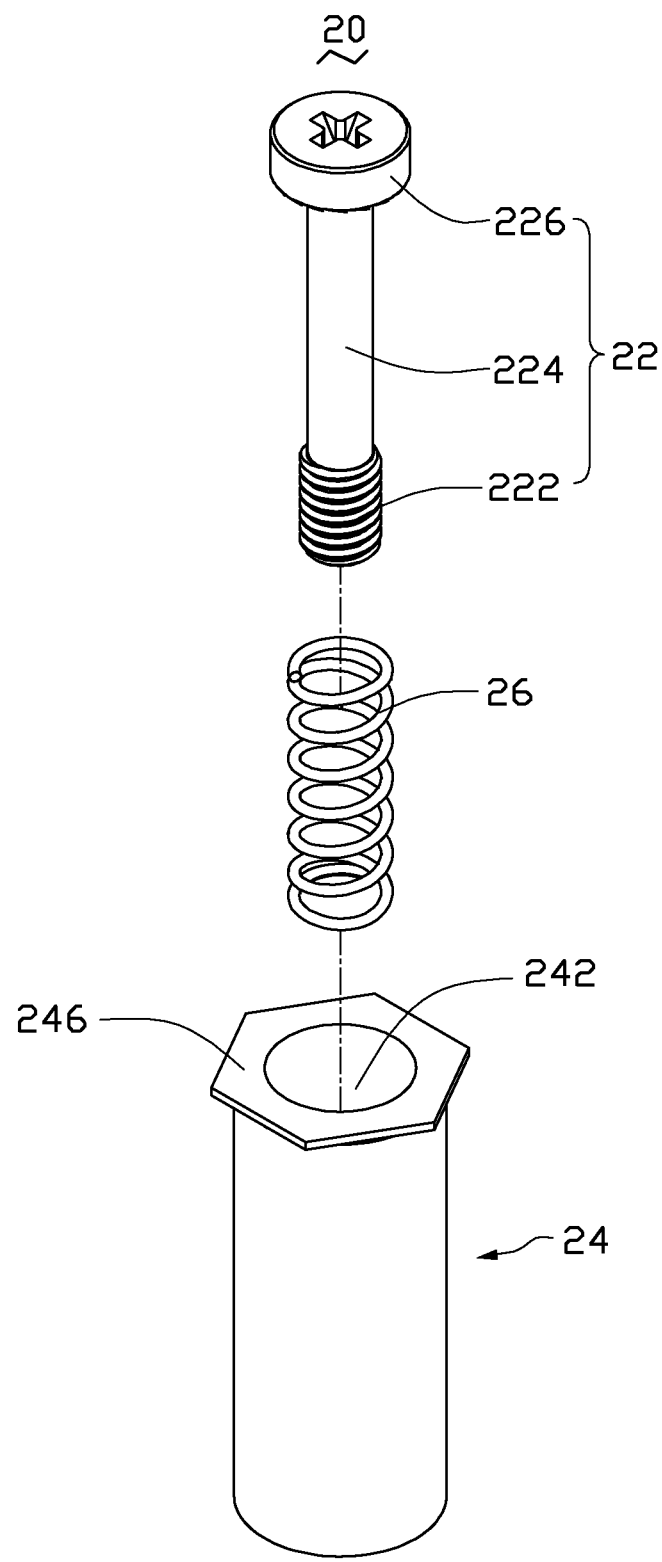
FIG. 1 is an exploded, isometric view of a locking assembly according to a first preferred embodiment of the present invention.
Figure 2:
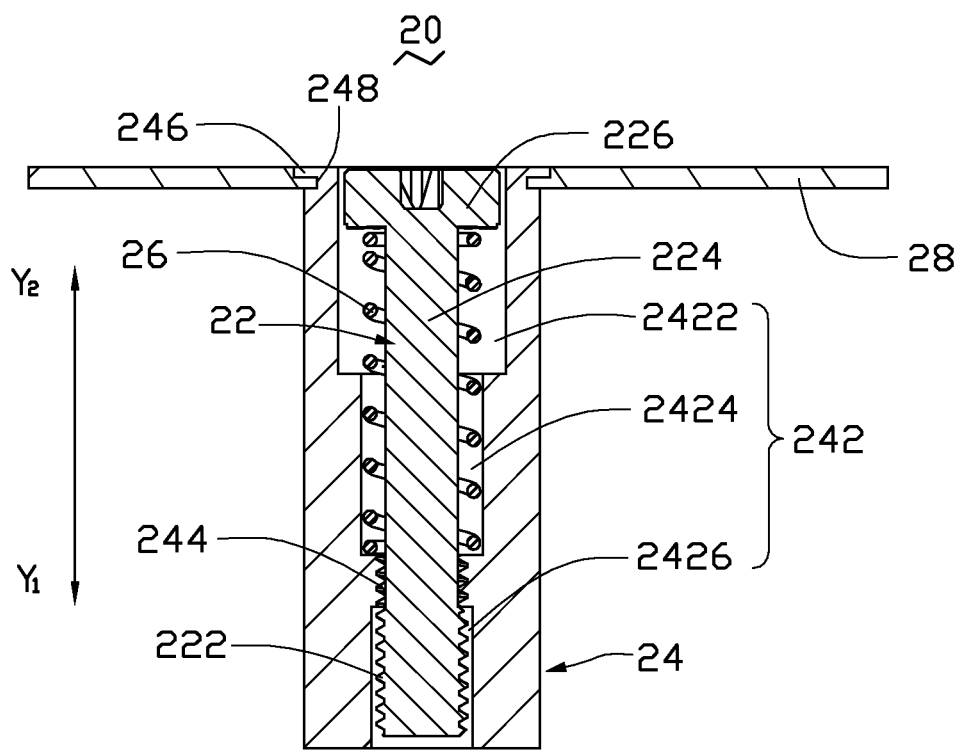
FIG. 2 is an assembled, side cross-sectional view of the locking assembly of FIG. 1, the locking assembly assembled with a second object.

Referring to FIGS. 1 and 2, a locking assembly 20 in accordance with a first preferred embodiment of the present invention is shown. The locking assembly 20 is preferably used to fasten at least two metal sheets or plastic sheets together such as electrical circuit boards, electronic devices, and other computer components. The locking assembly 20 includes a fastener 22, a sleeve 24, and a resilient member 26. The sleeve 24 is provided for holding and guiding the fastener 22. The fastener 22 is essentially a screw that includes a head portion 226, a neck portion 224, and a threaded portion 222. An end of the neck portion 224 connects the head portion 226 and another end of the neck portion 224 connects the threaded portion 222. The sleeve 24 is substantially a cylinder, which defines a through hole 242 along a center axis of the sleeve 24. The through hole 242 includes three connecting parts in a following order: a first part 2422, a second part 2424, and a third part 2426. The sleeve 24 further includes a restricting portion 244 extending out from an inner surface of the through hole 242 between the second part 2424 and the third part 2426. The restricting portion 244 defines an inner screw threading.

The threaded portion 222 of the fastener 22 defines an outer screw threading to engage with the inner screw threading of the restricting portion 244. Therefore, the threaded portion 222 can be screwed through the restricting portion 244 correspondingly.

In this embodiment, the locking assembly 20 is used to fasten a first object (not shown) and a second object 28. In assembling, when the fastener 22 is mounted into the through hole 242 of the sleeve 24 along a $Y_1$-direction, the threaded portion 222 of the fastener 22 is driven to pass through the restricting portion 244, and finally screwed into a threaded hole of the first object (not shown). The restricting portion 244 is configured for preventing the threaded portion 222 to slide out, thus also preventing the fastener 22 to slide out of the sleeve 24.

In this embodiment, a depth of the through hole 242 of the sleeve 24 is configured deeper than the length of the fastener 22, for protecting the fastener 22 better. A maximum outer diameter of the threaded portion 222 of the fastener 22 is larger than that of the neck portion 224, and smaller than that of the head portion 226. An inner diameter of the first part 2422 of the through hole 242 is larger than the outer diameter of the head portion 226. An inner diameter of the second part 2424 of the through hole 242 is smaller than the outer diameter of the head portion 226, but larger than the largest of the outer diameters of the neck portion 224 and the threaded portion 222. An inner diameter of the third part 2426 of the through hole 242 is smaller than that of the second part 2424. The inner diameter of the third part 2426 is larger than or equal to the outer diameter of the threaded portion 222 of the fastener 22. The head portion 226 of the fastener 22 can be held in the first part 2422 of the through hole 242 of the sleeve 24.

In this embodiment, the resilient member 26 is a spring. An outer diameter of the resilient member 26 is larger than a minimum diameter of the restricting portion 244. An inner diameter of the resilient member 26 is larger than the diameters of the threaded portion 222, but smaller than the diameter of the head portion 226 of the fastener 22. In assembling, the resilient member 26 is disposed in the through hole 242 of the sleeve 24 above the restricting portion 244. The threaded portion 222 of the fastener 22 pass through the resilient member 26. After the fastener 22 is screwed into the first object (not shown), opposite ends of the resilient member 26 resists the head portion 226 of the fastener 22 and the restricting portion 244 of the sleeve 24 correspondingly. If the fastener 22 is detached from the first object, the resilient member 26 produces a force pushing the fastener 22 upwards out of the sleeve 24, but the restricting portion 244 would block the fastener 22 from sliding out of the sleeve 24. This configuration allows re-assembling the locking assembly 20 quickly. Alternatively, the resilient member 26 can be omitted.

The sleeve 24 further includes a flange portion 246 extending out from an outer surface of the sleeve 24 adjacent to a distal end of the first part 2422 of the through hole 242. Preferably, the sleeve 24 may further define a latching slot 248 in the outer surface adjoining the flange portion 246. The second object 28 defines an opening (not labeled). A diameter of the flange portion 246 is larger than that of the opening of the second object 28. The sleeve 24 with the fastener 22 partially passes through the opening of the second object 28. The second object 28 is attached to the assembly at the latching slot 248. After the fastener 22 is screwed into the first object, the second object 28 is firmly held by the flange portion 246 of the sleeve 24, such that the first object (not shown) and the second object 28 are fastened together. In an alternatively embodiment, the latching shot 248 of the sleeve 24 can be omitted as long as the second object 28 defines a hole to contain the sleeve 24 correspondingly.

Alternatively, the depth of the through hole 242 of the sleeve 24 can be equal to or smaller than the length of the fastener 22.

It is to be understood that, any two parts of the first part 2422, the second part 2424 and the third part 2426 of the through hole 242 can be omitted. For example, a second preferred embodiment of the present invention is described, in detail, in following paragraphs.

Figure 3:
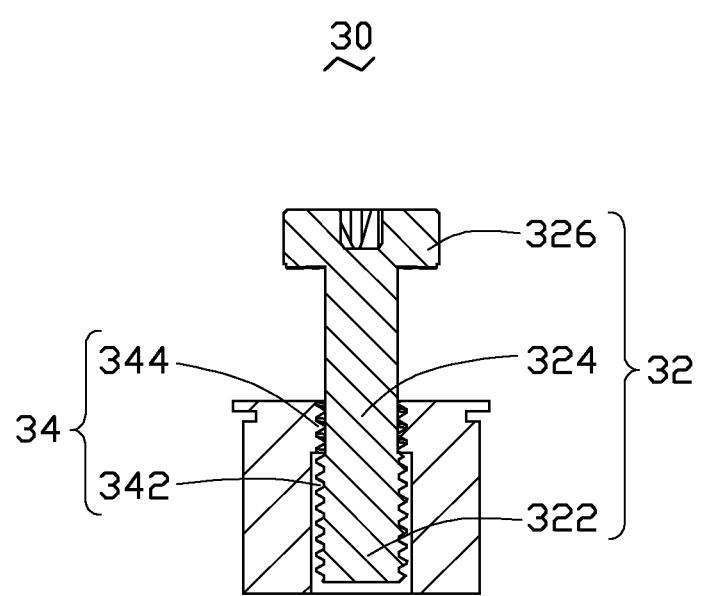
FIG. 3 is an assembled, side cross-sectional view of a locking assembly according to a second preferred embodiment of the present invention.
Figure 4:
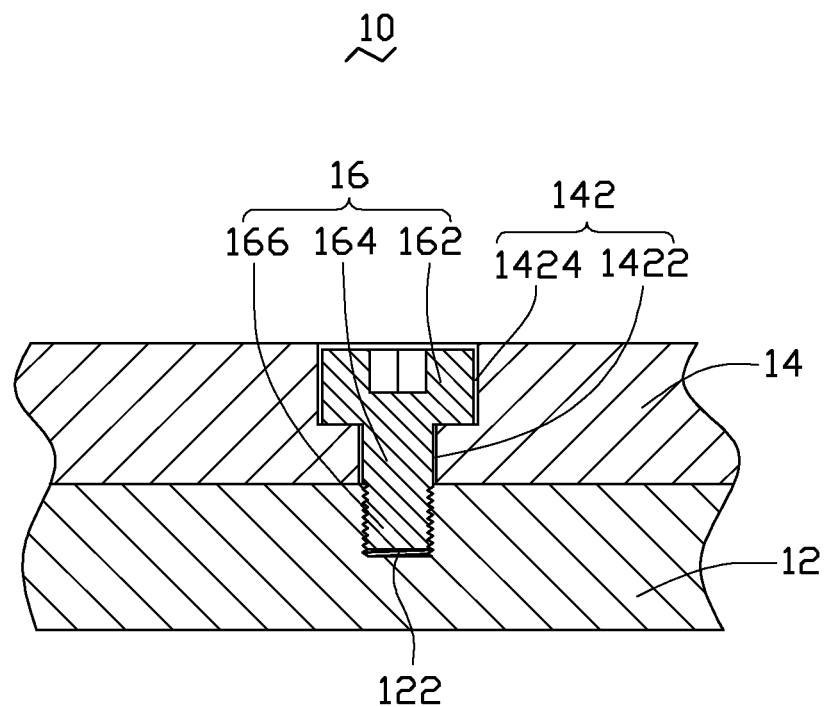
FIG. 4 is an abbreviated, side cross-sectional view of a conventional locking assembly fixing two objects together.

Referring to FIG. 3, a locking assembly 30 in accordance with a second preferred embodiment of the present invention is shown. The locking assembly 30 includes a fastener 32 and a sleeve 34. The fastener 32 includes a head portion 326, a neck portion 324, and a threaded portion 322. The locking assembly 30 is similar in principle to the locking assembly 20 of the first embodiment. However, the sleeve 34 defines a through hole 342 and further includes a restricting portion 344 extending from an inner surface of one end of the through hole 342. After the threaded portion 322 of the fastener 32 is driven to pass through the restricting portion 344 of the sleeve 34, the restricting portion 344 can block the locking portion from sliding out of the sleeve 34.

In an alternatively embodiment, the restricting portion 344 can be formed at opposite end of the inner surface of the through hole 342. The threaded portion 322 passes through the through hole 342 in a direction from one end of the through hole 342 without restricting portion 344 to the opposite end of the through hole 342 having restricting portion 344.

It is to be understood that, the fastener 22, 32 can be replaced by any other locking members, the locking member having a locking portion and a neck portion connected to the locking portion. The lock portion can be one of latches or latching grooves that firmly mates with corresponding structures defined in object that will be fastened. Correspondingly, the restricting portion 244, 344 is replaced by one of elastic hooks or protruding ribs. For example, if the restricting portion is an elastic hook defined on inner surface of the through hole of the sleeve, the locking portion of the locking member can be pressed to pass through the elastic hook, but restricted by a hook of the elastic hook backward. If the restricting portion is a protruding rib (like the restricting portion 244, 344 without inner screw thread), the locking portion can pass through the protruding rib when the protruding rib is heated to expand. Alternatively, the locking portion of the locking member is firstly to pass through the restricting portion, then a plurality of dots are formed on the restricting portions for restricting the locking member backward.

Finally, while the present invention has been described with reference to particular embodiments, the description is illustrative of the invention and is not to be construed as limiting the invention. Therefore, various modifications can be made to the embodiments by those skilled in the art without departing from the true spirit and scope of the invention as defined by the appended claims.

What is claimed is:

1. A locking assembly, for locking a first workpiece and a second workpiece, comprising:
   a locking member comprising a neck portion having a first end and a second end, a head portion connected to the first end of the neck portion, and a locking portion connected to the second end of the neck portion for locking with the first workpiece, wherein an outer diameter of the locking portion is larger than that of the neck portion; and
   a sleeve defining a through hole therein for holding and guiding the locking member, the through hole comprising a first part, a second part, and a third part communicating with the first part and the second part in that order, wherein the sleeve comprises a restricting portion extending out from an inner surface of the through hole between the second part and the third part, the locking portion is threaded and the restricting portion defines an inner screw threading thereon corresponding to the threading of the locking portion, such that when the locking portion of the locking member screwedly passes through the restricting portion of the sleeve, and finally the inner screw threading of the restricting portion blocks the locking portion from sliding out of the sleeve along a direction from the locking portion towards the head portion; and the head portion is received in the first part of the through hole, the sleeve defines a latching slot in an outer surface of the sleeve adjoining the first part, for latching with the second workpiece.

2. The locking assembly as claimed in claim 1, wherein an inner diameter of the first part of the through hole is larger than the outer diameter of the head portion.

3. The locking assembly as claimed in claim 1, wherein an inner diameter of the second part of the through hole is smaller than the outer diameter of the head portion, the inner diameter of the second part of the through hole is larger than the outer diameter of the neck portion, and the inner diameter of the second part of the through hole is larger than the outer diameter of the locking portion.

4. The locking assembly as claimed in claim 1, wherein an inner diameter of the third part of the through hole is smaller than that of the second part, and the inner diameter of the third part of the through hole is larger than or equal to the outer diameter of the locking portion.

5. The locking assembly as claimed in claim 1, further comprising a resilient member disposed in the through hole of the sleeve, and is compressed between the head portion of the locking member and the restricting portion of the sleeve.

6. The locking assembly as claimed in claim 1, wherein an outer diameter of the resilient member is larger than a minimum diameter of the restricting portion.

7. The locking assembly as claimed in claim 6, wherein an inner diameter of the resilient member is larger than the diameters of the locking portion and the neck portion, but smaller than the diameter of the head portion.

8. A locking assembly, for locking a first workpiece and a second workpiece, comprising:

a locking member comprising a neck portion having a first end and a second end, a head portion connected to the first end of the neck portion, and a locking portion connected to the second end of the neck portion for locking with the first workpiece, wherein an outer diameter of the locking portion is larger than that of the neck portion;

a sleeve defining a through hole therein for holding and guiding the locking member, the through hole including a first part, wherein the sleeve comprises a restricting portion extending out from an inner surface of the through hole adjoining the first part of the through hole, the locking portion is threaded and the restricting portion defines an inner screw threading thereon corresponding to the threading of the locking portion, such that when the locking portion of the locking member screwedly passes through the restricting portion of the sleeve, and finally the inner screw threading of the restricting portion blocks the locking portion from sliding out of the sleeve along a direction from the locking portion towards the head portion; the head portion is received in the first part of the through hole, the sleeve defines a latching slot in an outer surface of the sleeve adjoining the first part, for latching with the second workpiece; and a resilient member positioned between the head portion of the locking member and the restricting portion of the sleeve.

* * * * *